US008085129B2

(12) United States Patent
Mullet et al.

(10) Patent No.: US 8,085,129 B2
(45) Date of Patent: Dec. 27, 2011

(54) POWER CONSERVING MOBILE TRANSMITTER USED WITH AN AUTOMATED BARRIER OPERATING SYSTEM

(75) Inventors: Willis J. Mullet, Gulf Breeze, FL (US); Jason L. Mamaloukas, Reminderville, OH (US)

(73) Assignee: Homerun Holdings Corporation, Pensacola, FL (US)

( * ) Notice: Subject to any disclaimer, the term of this patent is extended or adjusted under 35 U.S.C. 154(b) by 744 days.

(21) Appl. No.: 12/229,092

(22) Filed: Aug. 20, 2008

(65) Prior Publication Data

US 2010/0045429 A1 Feb. 25, 2010

(51) Int. Cl.

*G06F 7/00* (2006.01)
*H04Q 9/00* (2006.01)
*G05B 23/00* (2006.01)

(52) U.S. Cl. ....... 340/5.7; 340/5.61; 340/5.64; 340/5.71

(58) Field of Classification Search .................. 340/5.7, 340/5.72, 5.71, 5.61, 5.64, 436; 701/201–226; 318/16

See application file for complete search history.

(56) References Cited

U.S. PATENT DOCUMENTS

| | | | | |
|---|---|---|---|---|
| 4,492,111 | A | 1/1985 | Kirkland | 73/84 |
| 5,412,297 | A | 5/1995 | Clark et al. | 318/468 |
| 5,419,010 | A | 5/1995 | Mullet | 16/198 |
| 5,596,840 | A | 1/1997 | Teich | 49/26 |
| 5,625,980 | A | 5/1997 | Teich et al. | 49/26 |
| 5,699,055 | A | 12/1997 | Dykema et al. | 340/825.22 |
| 6,028,537 | A | 2/2000 | Suman et al. | 340/988 |
| 6,271,765 | B1 | 8/2001 | King et al. | 340/825.69 |
| 6,542,076 | B1 | 4/2003 | Joao | 340/539 |
| 6,617,961 | B1 * | 9/2003 | Janssen et al. | 340/5.8 |
| 6,634,408 | B2 * | 10/2003 | Mays | 160/188 |
| 6,658,328 | B1 * | 12/2003 | Alrabady et al. | 701/1 |
| 7,310,043 | B2 | 12/2007 | Mamaloukas | 340/5.61 |
| 7,327,107 | B2 | 2/2008 | Mullet et al. | 318/280 |
| 7,327,108 | B2 | 2/2008 | Mullet et al. | 318/280 |
| 7,492,898 | B2 * | 2/2009 | Farris et al. | 380/239 |
| 7,498,936 | B2 * | 3/2009 | Maeng | 340/539.1 |
| 7,515,063 | B2 * | 4/2009 | Brundula | 340/6.11 |
| 7,557,690 | B2 * | 7/2009 | McMahon | 340/426.13 |
| 7,839,263 | B2 * | 11/2010 | Shearer | 340/5.23 |

(Continued)

FOREIGN PATENT DOCUMENTS

| | | |
|---|---|---|
| EP | 1 447 775 | 8/2004 |

(Continued)

*Primary Examiner* — Daniel Wu
*Assistant Examiner* — Mohamed Barakat
(74) *Attorney, Agent, or Firm* — Renner Kenner Greive Bobak Taylor & Weber

(57) ABSTRACT

An operator system for automatically controlling access barriers based on movement of a carrying device. The system consists of an operator controller associated with an access barrier, a base receiver associated with the base controller, and a mobile transmitter that includes an activity sensor configured to monitor movement in at least one axis of movement and a mobile emitter. The mobile transmitter is configured to automatically emit from the mobile emitter a mobile open signal and a mobile close signal containing at least one warning data bit that is placed in a set state when the activity sensor first detects a change in movement of the mobile transmitter. The base receiver receives the mobile open signal and mobile close signal, and the operator controller resets a last process variable when the at least one warning bit is received.

17 Claims, 8 Drawing Sheets

U.S. PATENT DOCUMENTS

| | | | | |
|---|---|---|---|---|
| 7,852,212 | B2 * | 12/2010 | Fitzgibbon | 340/545.1 |
| 2003/0033540 | A1 | 2/2003 | Fitzgibbon | 713/200 |
| 2004/0012483 | A1 | 1/2004 | Mays | 340/5.71 |
| 2004/0239482 | A1 | 12/2004 | Fitzgibbon | 340/5.61 |
| 2005/0134426 | A1 * | 6/2005 | Mullet et al. | 340/5.7 |
| 2007/0046428 | A1 * | 3/2007 | Mamaloukas et al. | 340/5.61 |

FOREIGN PATENT DOCUMENTS

| | | |
|---|---|---|
| GB | 2 351 171 | 12/2000 |
| WO | WO 2006/015418 | 2/2006 |

* cited by examiner

POWER CONSERVING MOBILE TRANSMITTER USED WITH AN AUTOMATED BARRIER OPERATING SYSTEM

TECHNICAL FIELD

Generally, the present invention relates to transmitters used with a barrier operator system to actuate an access barrier, such as a garage door. More particularly, the present invention relates to the use of a mobile transmitter maintained in a carrying device, such as a vehicle, to initiate the opening and closing of an access barrier depending upon the position of the carrying device relative to the access barrier. Specifically, the present invention relates to a mobile transmitter having an activity sensor to determine the operational status of the carrying device, whereby the mobile transmitter is configured to send signals to an operator system which moves the access barrier in a desired direction, and wherein the mobile transmitter includes information in the signals as to whether the carrying device is about to go inactive or is just becoming active so as to further improve control of the access barrier.

BACKGROUND

An access barrier, such as a garage door, often includes an operator with a motor that moves the door between opened and closed limit positions. In addition, operators, also referred to as an operating system, may also be coupled with other types of movable access barriers, such as gates, curtains, windows, retractable overhangs and the like. A barrier operating system is employed to control the motor and related functions with respect to the door. Thus, in order to open and close the door, the operator is configured to receive command signals from a wireless portable remote transmitter, a wired or wireless wall station, a keyless entry device or other similar device. Safety devices that are connected to the operator may also be provided for the purpose of detecting an obstruction so that the operator may then take corrective action with the motor to avoid entrapment of the obstruction.

Remote transmitters allow users to open and close garage doors without getting out of their vehicle. In addition, these remote transmitters may also be provided with other features, such as the ability to control multiple doors, lights associated with the operators, and other security features. The remote transmitters and operators may also be provided with encrypted codes that change after every operation cycle so as to make it virtually impossible to "steal" a code and use it at a later time for illegal purposes. The operation cycle of the barrier operator may include opening and closing of the barrier and turning on-and-off a light that is connected to the operator and so on.

Although remote transmitters and similar devices are convenient and generally work well, such remote transmitters tend to become lost, misplaced or broken. Furthermore, the switch mechanism of the remote transmitter typically becomes worn after a period of time and requires replacement. To overcome the deficiencies of the remote transmitters, "hands-free" remote transmitters have been developed in a number of different forms. In general, a "hands-free" remote transmitter does not require a user to initiate physical contact with the transmitter or switch in order to cause some physical action to take place at the barrier operator, such as the movement of the garage door. Prior art hands-free systems comprise a "mobile" transmitter that communicates, via various mobile signals, with the barrier operator that is configured to move an access barrier, such as a garage door, between opened and closed positions. In some hands-free systems, only the mobile transmitter may generate signals that are received and acted upon by the barrier operator. In any event, the mobile transmitter is generally maintained or otherwise carried by a carrying device, such as a vehicle.

During operation, the hands-free mobile transmitter is configured to transmit mobile signals to the barrier operator so as to move the access barrier between open and closed positions depending on the relative position of the carrying device to the barrier operator and various other criteria. Because the operation of the hands-free system requires mobile signals to be generated by the mobile transmitter for a period of time following the activation and deactivation of the carrying device that contains the mobile transmitter, the hands-free system, in one aspect, sends the mobile signals continuously at all times. However, mobile transmitters that continuously transmit mobile signals tend to rapidly consume the capacity of their batteries, thus necessitating the frequent and inconvenient replacement of batteries or recharge thereof. In order to increase the convenience of the system, prior-art systems contemplated the utilization of an activity sensor that comprises a vibration or noise detection sensor, which monitors when the vehicle that carries the mobile transmitter is started or turned off. By monitoring such phenomena, the activity sensor is able to selectively turn the mobile transmitter on and off in an attempt to conserve the battery power used to operate the mobile transmitter.

Another problem with some hands-free systems is that when the hands-free mobile transmitter no longer detects movement of the carrying device, the mobile transmitter stops sending mobile signals. This can be interpreted by the barrier operator that the carrying device has moved sufficiently away from the area, but this may not be the case. As a result, the barrier operator will generate a door close command when in fact such an action is not desired by the user. As a result, although such a hands-free system is effective when the carrying device is approaching and leaving the barrier operator area, unwanted door movements may result.

Therefore, there is a need in the art for a barrier operator system that automatically moves the access barrier depending upon the proximity of a carrying device that is carrying a remote mobile transmitter to the access barrier, wherein the mobile transmitter automatically emits somewhat periodic mobile signals that are received by, or are received and then lost by, a barrier operator, which then moves the access barrier and ignores subsequent transmitter signals for a predetermined period of time. Additionally, there is a need for a mobile transmitter that utilizes an activity sensor, such as an accelerometer, to detect when the carrying device, such as a vehicle, is moving so as to generate mobile signals, and which incorporates warning bits in the mobile signals that indicate when the carrying device is first turning on and when the carrying device is about to turn off.

SUMMARY OF THE INVENTION

In light of the foregoing, it is a first aspect of the present invention to provide a power conserving mobile transmitter used with an automated barrier operator system.

Another aspect of the present invention is to provide an operator system for automatically controlling access barriers based on movement of a carrying device, comprising an operator controller associated with an access barrier, a base receiver associated with the base controller, a mobile transmitter including an activity sensor configured to monitor movement in at least one axis of movement and a mobile emitter, the mobile transmitter configured to automatically emit from the mobile emitter a mobile open signal and a mobile close signal containing at least one warning data bit that is placed in a set state when the activity sensor first detects a change in movement of the mobile transmitter, wherein the base receiver receives the mobile open signal and the mobile close signal and the operator controller resets a last process variable when the at least one warning bit is received.

Yet another aspect of the present invention is a method for automatically controlling at least one access barrier comprising providing a mobile transmitter having an activity sensor and a mobile emitter, the mobile emitter configured to automatically generate a mobile open signal and a mobile close signal when the activity sensor detects movement of the mobile transmitter, providing an operator controller associated with a base receiver and an access barrier, the base receiver receiving the mobile open signal and the mobile close signal, setting at least one warning bit that is included in the mobile open signal and the mobile close signal when the activity sensor first detects a change in movement of the mobile transmitter, and moving the access barrier by the operator controller depending upon a status of the at least one warning bit and receipt of the mobile open signal or loss of the mobile close signal.

BRIEF DESCRIPTION OF THE DRAWINGS

These and other features and advantages of the present invention will become better understood with regard to the following description, appended claims, and accompanying drawings wherein:

BEST MODE FOR CARRYING OUT THE INVENTION

Figure 1:
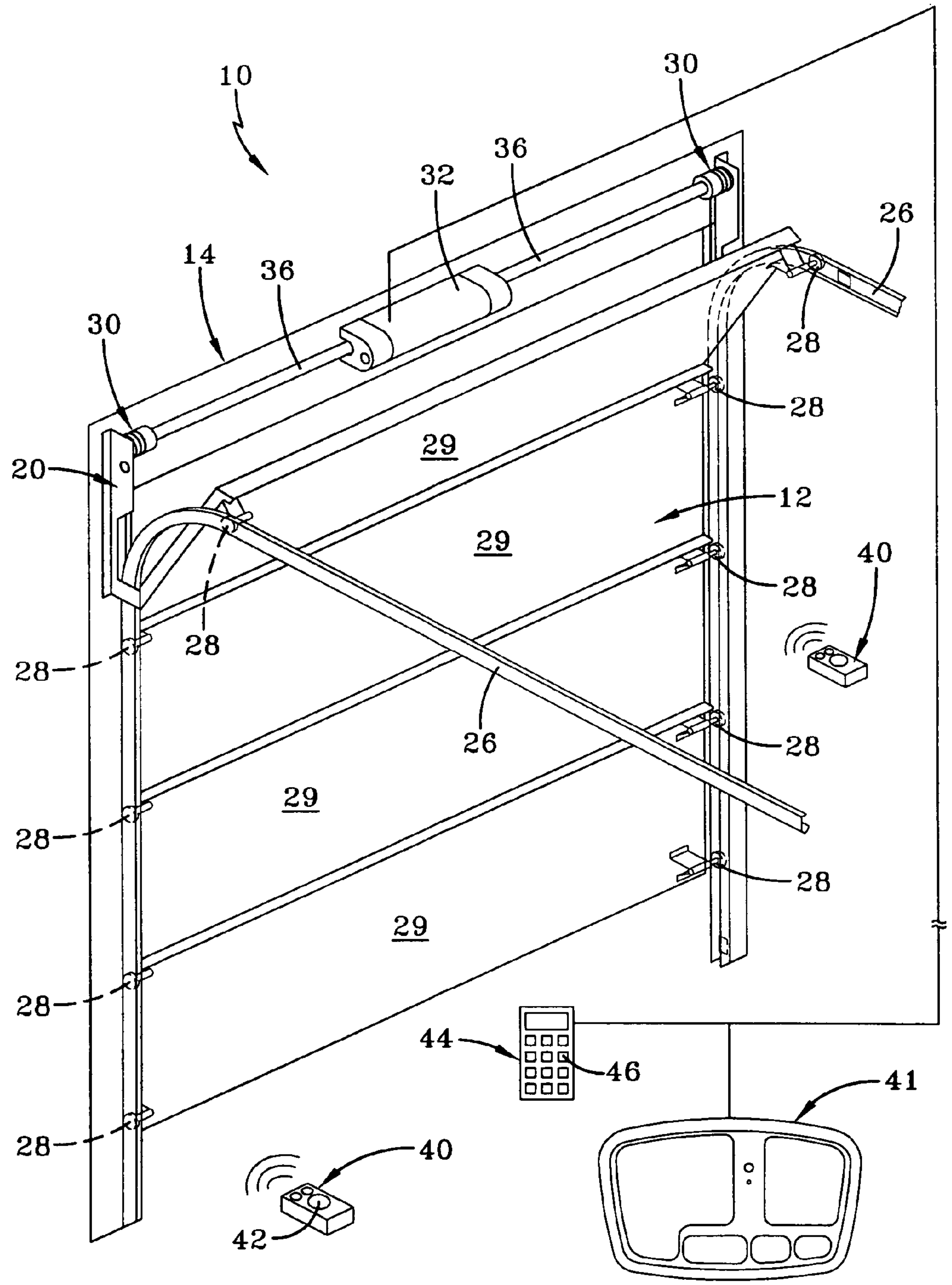
FIG. 1 is a perspective schematic view depicting a sectional garage door and associated barrier operator in accordance with the concepts of the present invention.

An access barrier operator system, which incorporates the concepts of the present invention, is generally designated by the numeral 10 as shown in FIG. 1. Although the present discussion relates to the use of an access barrier, such as a sectional garage door, it will be appreciated that the present invention is applicable to other types of access barriers including single panel doors, gates, windows, curtains, retractable overhangs and any device that at least partially encloses or restricts access to an area. Moreover, the present invention is applicable to locks or an automated control of any device based upon an operational status, position, or change in position of a proximity or other triggering device. Indeed, it is envisioned that the present invention could be used as a remote keyless entry for automobiles, houses, buildings and the like. The disclosed system could be used in any scenario where an object (such as a garage door controlled by an operator) changes state or condition (open/close, on/off, etc.) based upon a position (away/home) or change in position (approaching/leaving) of a second object, such as a mobile transmitter, with respect to the first object. As such, the discussion of the system 10 presented below encompasses three subject matter areas: the barrier operator; the hands-free mobile transmitter; and the operation of the mobile transmitter with the barrier operator.

I. Barrier Operator

The barrier operator system 10 may be employed in conjunction with a conventional sectional garage door or other movable access barrier generally indicated by the numeral 12, as shown in FIG. 1 of the drawings. The opening in which the access barrier 12 is positioned to control access therethrough is surrounded by a frame generally indicated by the numeral 14. A track 26 extends from each side of the door frame and receives a roller 28, which extends from the top edge of each of the sections 29 that comprise the access barrier 12. Furthermore, a counterbalancing system, generally indicated by the numeral 30, may be employed to balance the weight of the access barrier 12 when moving between open and close positions. One example of a suitable counterbalancing system for use with the barrier operator system 10 is disclosed in U.S. Pat. No. 5,419,010, which is incorporated herein by reference.

Figure 2:
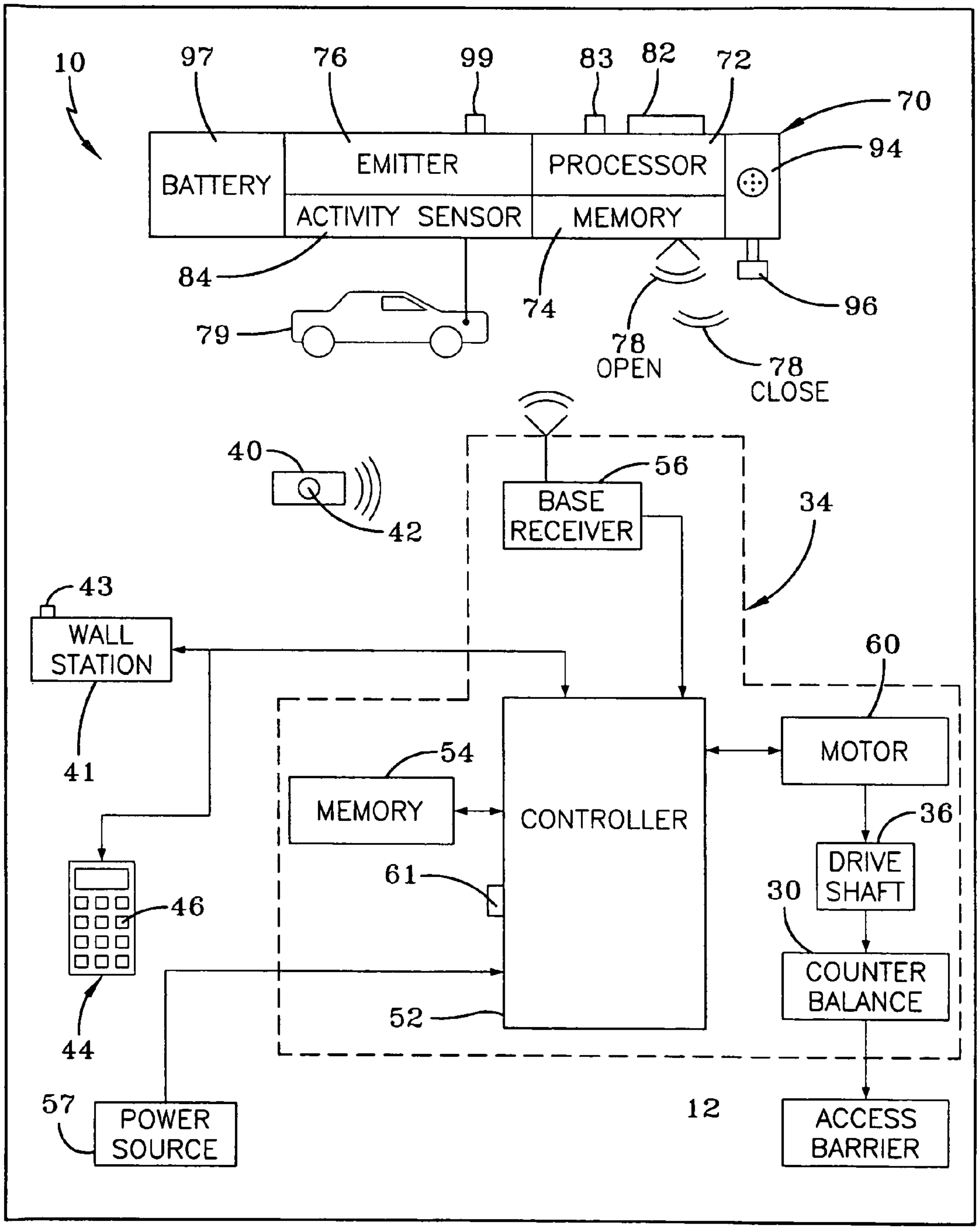
FIG. 2 is a block diagram of an operator system utilizing a remote mobile transmitter in accordance with the concepts of the present invention.

An operator housing 32, which is affixed to the frame 14, carries a barrier operator 34 as shown in FIG. 2 of the drawings. Extending through the operator housing 32 is a drive shaft 36 which is coupled to the access barrier 12 by cables or other commonly known linkage mechanisms maintained by the counterbalancing system 30. As such, the drive shaft 36, which may be in the form of a drive tube, transfers the necessary mechanical power to actuate the access barrier 12 between opened and closed positions. Although a header-mounted barrier operator is disclosed herein, the control features to be discussed are equally applicable to other types of barrier operators that are used with movable access barriers. For example, the control routines employed by the barrier operator 34 can be easily incorporated into trolley-type, belt-drive, screwdrive-type and jackshaft-type operators, and the like so as to move garage doors or other types of access barriers.

In order to control the movement of the access barrier 12, a plurality of wired and wireless transmitters may be utilized with the barrier operator 34. In particular, the barrier operator 34 may be controlled by a wireless remote transmitter 40, or a wall station control 41 that is wired directly to the barrier operator 34 or which communicates with the barrier operator 34 via radio frequency (RF) or infrared (IR) signals. The remote transmitter 40 maintains a suitable button or switch 42 that when actuated initiates movement of the access barrier 12 between opened and closed positions. Similarly, the wall station control 41 is maintained within a housing, which has a plurality of command buttons, each of which when actuated transmits a particular command to the barrier operator 34.

The barrier operator system 10 may also be controlled by a keyless alphanumeric device 44, which includes a plurality of keys 46 with alphanumeric indicia thereon. Actuating the keys 46 in a predetermined sequence allows for actuation of the system 10. Thus, the operation of the devices 40, 41 and 44 allows the user to selectively initiate the opening and closing movements of the access barrier 12 via the barrier operator 34. It should be appreciated that the transmitters 40,41,44 may be powered by any suitable portable power source, such as a battery or multiple batteries, although the wall station transmitter 41 may be alternately powered by electrical power supplied by a standard wall socket that supplies AC power. Moreover, the control features set forth are also applicable to any type of actuation system which changes states or condition (open/close, on/off, etc.) based upon a position of an actuation device (docked/away, approaching/leaving, etc.) with respect to the actuation system.

The barrier operator 34 includes an operator controller 52, which incorporates the necessary software, hardware and memory for controlling the operation of the overall system and for implementing the various advantages of the present invention. Indeed, the controller 52 may be a logic control that uses a general purpose or application specific semiconductor based microprocessor/microcontroller. In electrical communication with the operator controller 52 is a non-volatile memory storage device 54, such as a flash memory for example, for permanently storing information utilized by the operator controller 52 in conjunction with the operation of the barrier operator 34. Infrared and/or radio frequency command signals generated by the transmitters 40,41,44 and the mobile transmitter to be discussed are received by a suitable antenna coupled to a base receiver 56 which transfers the received information to a decoder contained within the operator controller 52. Those skilled in the art will appreciate that the base receiver 56 may be replaced with a transceiver, which would allow the operator controller 52 to facilitate learning of other devices, or to relay or generate command/status signals to other devices associated with the operator system 10. In particular, the operator controller 52 converts the received radio frequency signals or other types of wireless signals into a usable format. In one aspect, the operator controller 52 may comprise a controller of Model MSP430F1232 supplied by Texas Instruments, however, other equivalent receivers, transceivers and controllers could be utilized. Furthermore, the barrier operator 34 may be powered by any suitable power source, such as an AC mains power source 57. It should also be appreciated that the process for achieving hands-free operation may be achieved with controllers that are different and separate than the operator controller 52, or may be a single controller used for both operations.

The base receiver 56 is directly associated with the barrier operator 34, although the base receiver 56 could be a standalone device if desired. Specifically, the base receiver 56 receives signals in a frequency range centered about 372 MHz that are generated by each of the transmitters 40,41,44. The base receiver 56 may also receive signals within a frequency range of 900 to 950 MHz. Alternatively, the receiver 56 may be adapted to receive both ranges of frequencies. Indeed, one frequency range may be designated for only receiving door move signals from a transmitter, while the other frequency range receives identification type signals used to determine the position or travel direction of a mobile transmitter relative to the base receiver, as well as door move signals. Of course, the frequency ranges identified herein should not be construed as limiting, as other frequency ranges compatible with the system 10 and approved for use by the appropriate government agency may be used.

Any number of remote transmitters 40*a*-*x* can transmit a signal that is received by the base receiver 56 and further processed by the operator controller 52 as needed. Similarly, any number of wall stations 41 or keyless devices 44 may be utilized with the system 10. As such, if an input signal is received from either of the remote transmitter 40, the wall station control 41, or the keyless device 44 and found to be acceptable, the operator controller 52 generates the appropriate electrical signals for energizing a motor 60, which in turn rotates the drive shaft 36 so as to open and/or close the access barrier 12 via the counterbalancing system 30. It should also be appreciated that a learn button 61 may also be associated with the operator controller 52, wherein actuation of the learn button 61 allows the operator controller 52 to learn any of the different types of transmitters 40,41,44 used in the system 10 in a manner commonly known in the art.

II. Mobile Transmitter

A mobile transmitter 70, which may also be referred to as a hands-free transmitter or a proximity device, effectively operates in much the same manner as the other wireless transmitters 40,41,44, except direct manual input from the user is not required. However, it should be appreciated that the mobile transmitter 70 may be adapted to receive direct manual input to control various aspects of the system 10. As will be discussed in detail, the mobile transmitter 70, which serves as the actuation device, initiates a change in the state of the barrier operator 34 so as to move the access barrier 12 between opened and closed limit positions. The initiation of movement of the access barrier 12, as directed by the mobile transmitter 70, depends upon a number of factors such as: proximity of the mobile transmitter 70 to the base receiver 56; the direction of travel of the mobile transmitter 70 with respect to the base receiver 56; and/or the operational status of the various carrying devices that maintain or otherwise carry the mobile transmitter 70.

Specifically, the mobile transmitter 70 includes a processor 72 connected to a non-volatile memory 74. The processor 72 may include a logic control that uses a general purpose or application specific semiconductor-based microprocessor/microcontroller, which incorporates the necessary software, hardware and memory for controlling operation of the mobile transmitter 70. As will be discussed in further detail, the memory 74 may maintain system mobile state variables, count values, timer values, signal counts and the like, which are utilized to enable operation of the barrier operator system 10.

Further, the mobile transmitter 70 includes an emitter 76 that is capable of transmitting a mobile signal 78 on a periodic or recognizable non-periodic basis. For example, the transmitter 70 may output data for about one minute in the form of a 100 ms burst of data and a 900 ms pause (no data output), that is repeated 60 times. The data and/or format of the emitted mobile signal 78 may be changed depending upon a detected operational status of a carrying device 79, such as a vehicle for example, that is used to carry the mobile transmitter 70. Indeed, the mobile signal 78 may comprise multiple signals, each of which initiates different functions at the controller 52. The processor 72 and the memory 74 facilitate generation of the appropriate data to include in the mobile signal 78 inasmuch as one mobile transmitter 70 may be associated with multiple barrier operators 34, or in the event multiple remote mobile transmitters 70 are associated with a single barrier operator 34. In other words, the barrier controller 52 is able to distinguish the mobile signals 78 of different mobile transmitters 70 and act upon them accordingly. The system 10 will most likely be configured so that any access barrier movement commands generated by the mobile transmitter 70 can be overridden by any commands received from the portable transmitter 40, wall station transmitter 42, and keypad transmitter 44. A learn/door move button 82 and a sensitivity/cancel button 83, are also provided by the mobile transmitter 70, which allows for override commands and/or programming of the mobile transmitter 70 with respect to the operator controller 52.

The mobile transmitter 70 may simply be placed in a glove compartment or console of an automobile, or other carrying device 79, whereby the mobile transmitter 70 communicates with the operator controller 52 for the purpose of opening and closing the access barrier 12 depending upon the position of the mobile transmitter 70 with respect to the barrier operator 34. As such, after the mobile transmitter 70 and the operator controller 52 have "learned" each other, the user is no longer required to press a door move button maintained by the remote transmitter devices 40,41,44 to have the access barrier 12 open and close. Rather, the mobile transmitter 70 controls the movement of the access barrier 12 based on whether the carrying device 79 is approaching or is moving away from the barrier operator 34. If needed, manual actuation of the learn/door move button 82, after programming, may be used to override normal operation of the mobile transmitter 70 so as to allow for opening and closing of the access barrier 12, and also to perform other programming functions associated with the barrier operator 34. Whereas actuation of the sensitivity/cancel button 83, after programming, provides for temporary disablement of the hands-free features.

The mobile transmitter 70 also includes an activity sensor 84, which detects the acceleration or movement of the carrying device 79, the details of which will be presented below. It is also contemplated that additional components may be included with the mobile transmitter 70, such as an audio source 94 and a light source 96 for example. It is envisioned that the audio source 94 and/or the light source 96 may be employed to provide audible instructions/confirmation or light indications as to certain situations that need the immediate attention of the person utilizing the mobile transmitter 70. The audio and light sources 94 and 96 may also provide confirmation or rejection of the attempted programming steps to be discussed later. All of the components maintained by the mobile transmitter 70 are powered by a portable power source such as a battery 97 (or batteries) that is housed within the mobile transmitter 70. If desired, the battery 97 may be of a rechargeable type that is connectable to a power outlet provided by the carrying device 79.

During normal operation, the mobile transmitter 70 will be in an enabled condition, whereby the transmitter 70 may be in either a sleep mode or an awake mode. In the sleep or low-power mode, only limited components of the processor 72, such as a clock, are energized and the transmitter 70 consumes a few uA of current. In the awake mode, all the components of the processor are energized and the transmitter 70 consumes tens of mA of current. However, the mobile transmitter 70 may be disabled by actuating both buttons 82, 83 for a predetermined period of time. In the alternative, a slide switch 99, which may be recessed within the housing of the mobile transmitter 70, can be used to quickly enable or disable the operation of the transmitter 70. The slide switch 99 is connected to the processor 72, and upon its movement to a disable position, a cancel command is automatically generated prior to powering down of the mobile transmitter 70. This is done so that the operator controller 52 will not treat the powering down of the mobile transmitter 70 as a type of signal, such as the loss of a close signal.

Figure 3:
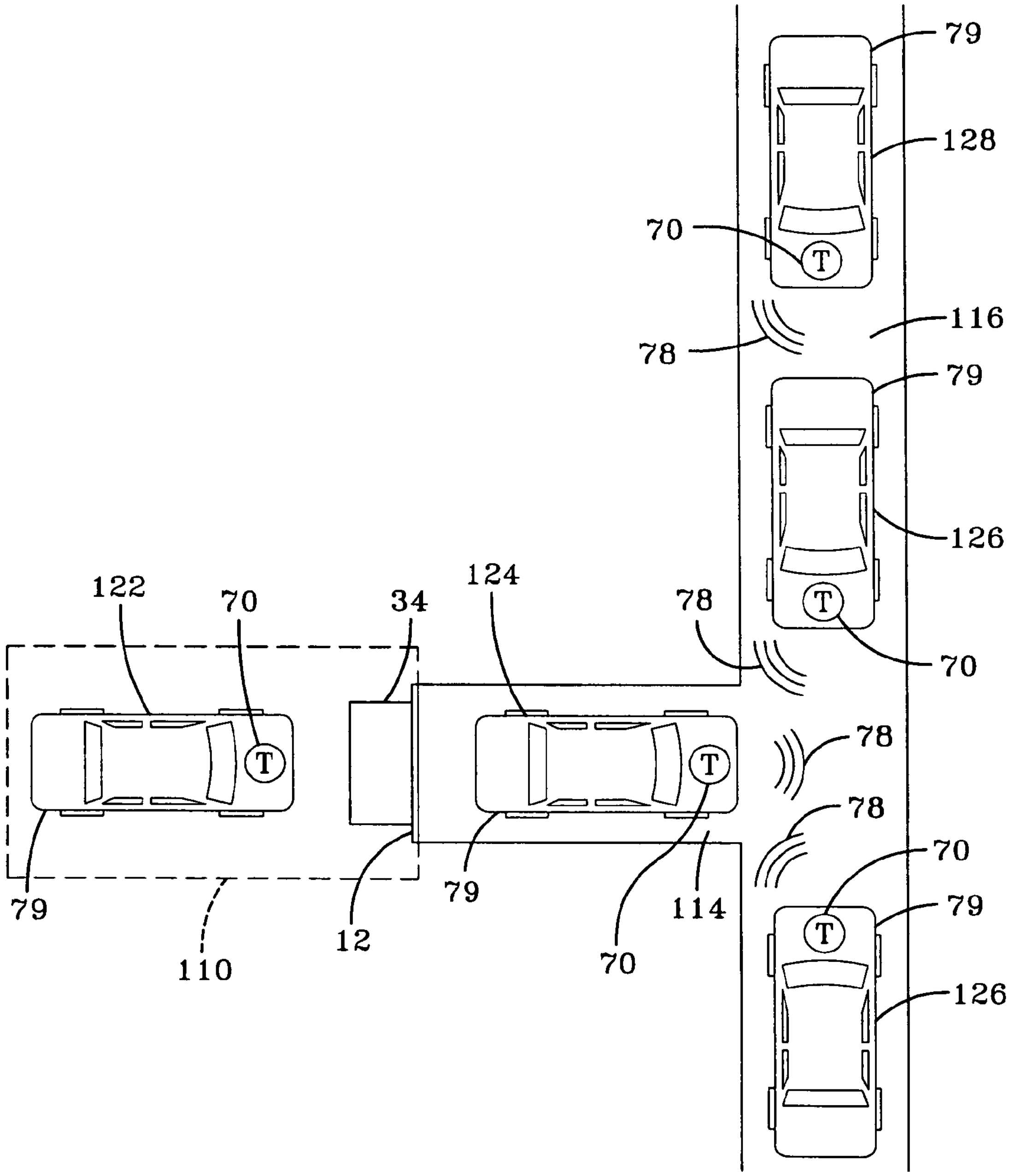
FIG. 3 is a schematic diagram of various positions of an exemplary carrying device with respect to an access barrier that utilizes the operator system in accordance with the concepts of the present invention.

The carrying device 79, such as the vehicle shown in FIG. 3, carries the mobile transmitter 70 to various positions with respect to the barrier operator 34 that is maintained within an enclosure 110, such as a garage, for example. The enclosure 110 is separated from its outer environs by the access barrier 12, which is controlled by the barrier operator 34 in the manner previously described. Access to the enclosure 110 is gained by a driveway 114 that is contiguous with a street 116 or other access road.

The carrying device 79 is positionable in the enclosure 110 or anywhere along the length of the driveway 114 and the street 116. Specifically, the carrying device 79 may be in either a "docked" state inside the enclosure 110 or in an "away" state anywhere outside of the enclosure 110. In some instances, the "away" state may further be defined as a condition whereby the signals generated by the mobile transmitter 70 are no longer receivable by the base receiver 56. As the description proceeds, other operational or transitional states of the mobile transmitter 70 will be discussed. As will become apparent, the mobile transmitter 70 initiates one-way communication with the operator controller 52 provided by the barrier operator 34. Although in certain embodiments, two-way communications between the barrier operator 34 and the mobile transmitter 70 may be employed for special situations.

The mobile transmitter 70 may transmit mobile signals 78 at different power levels, which consume additional current, and the signals are detected by the operator controller 52. Alternatively, the mobile transmitter 70 may generate mobile signal 78 at a single-power level. In any event, to assist in the understanding of the differences between the "docked" and "away" states and the various power thresholds associated therewith, specific reference to positions of the carrying device 79 with respect to the enclosure 110 are provided. In particular, it is envisioned that the vehicle 79 is in a "docked" state 122 when the vehicle or other carrying device 79 is positioned within, or just outside, the enclosure 110. An action position 124 designates when the carrying device 79 is immediately adjacent the access barrier 12, but outside the enclosure 110 and wherein action or movement of the access barrier 12 is likely desired. An energization position 126, which is somewhat removed from the action position 124, designates when an early communication link between the emitter 76 and the base receiver 56 needs to be established in preparation for moving the barrier 12 from an open to a closed position or from a closed position to an open position. Further from the energization position(s) 126 is an away position 128 for those positions where energization or any type of activation signal generated by the emitter 76 and received by the operator system is not recognized until the energization position(s) 126 is obtained. Indeed, entry into the away position 128 may be recognized by the operator controller 52 and result in initiation of access barrier 12 movement.

As previously discussed, the mobile transmitter 70 utilizes the activity sensor 84 to determine when the carrying device 79 is active or otherwise moving. The sensor 84 may be sensitive enough to detect a user entering the vehicle or carrying device 79. In particular, various sensors may be used to detect the movement of the carrying device 79, so as to indicate that it is in an operative condition.

Figure 4:
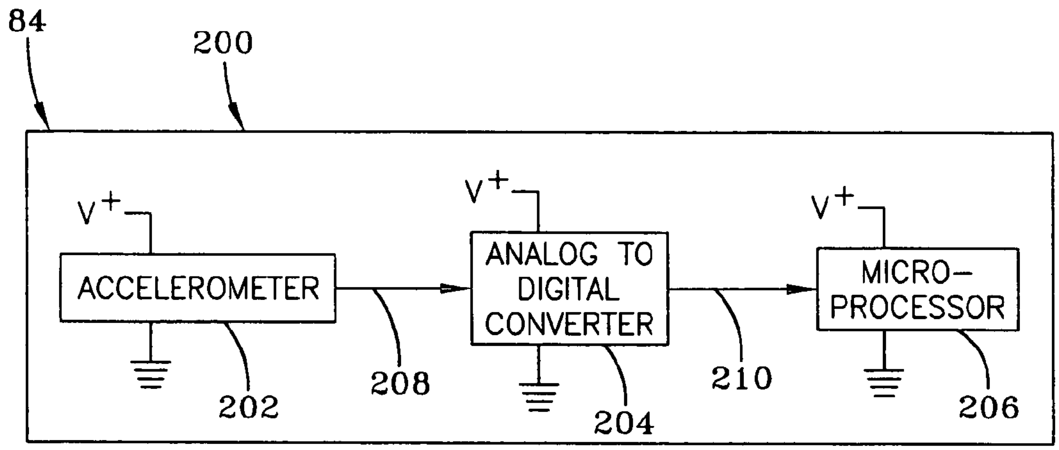
FIG. 4 is a block diagram of an activity sensor in the form of an accelerometer incorporated into the remote mobile transmitter utilized with the operator system in accordance with the concepts of the prevent invention.

Referring now to FIG. 4, an exemplary detection circuit incorporated into the activity sensor 84 is designated generally by the numeral 200. Generally, after determining whether the carrying device 79 is active, as evidenced by movement of the carrying device 79, the detection circuit 200 notifies the processor 72 of the mobile transmitter 70 whether to “Wake Up” or “Go to Sleep.” Thus, the detection circuit 200, along with the processes to be discussed in detail below, allows the operating life of the mobile transmitter 70 to be extended between changing or recharging the batteries 97 of the mobile transmitter 70. Alternatively, this circuit 200 may allow manufacturers to place smaller batteries in the mobile transmitter 70 while still offering users an equivalent battery life.

Figure 5:
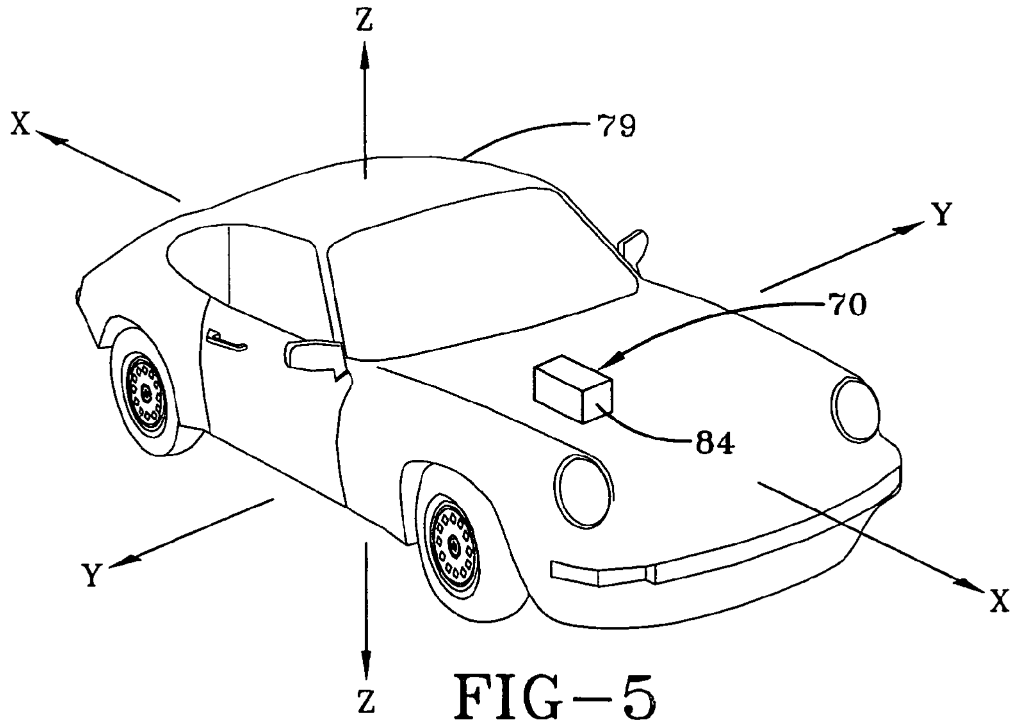
FIG. 5 is an elevational view showing the x, y and z axes that the accelerometer is monitoring in accordance with the concepts of the present invention.

Specifically, the detection circuit 200 may comprise an accelerometer 202, an analog-to-digital (A/D) converter 204, and a microprocessor 206. The accelerometer 202 is configured to detect acceleration along at least a single axis (e.g. x-axis) or along multiple axes (e.g. x-axis, y-axis and z-axis), as shown in FIG. 5. An exemplary accelerometer is the ADXL 323 manufactured by Analog Devices of Norwood, Mass., although other suitable accelerometers may be used. Thus, as the mobile transmitter 70 is accelerated due to the movement of the carrying device 79, the accelerometer 202 detects such acceleration or motion and outputs an analog detection signal 208 to the A/D converter 204. The A/D converter 204 digitizes the analog detection signal into a digital signal 210 so that it can be processed by the microprocessor 206 to determine whether the carrying device 79 has moved or not. It is contemplated that the accelerometer 202 may output a digital signal directly, thus obviating the need for the A/D converter 204 previously discussed. Furthermore, the microprocessor 206, which is in communication with the controller 52 via the mobile signals 78, comprises the necessary hardware and software needed to interpret the detection signals output from the accelerometer 202. Additionally, the functions provided by the microprocessor 206 may be carried out by the processor 72 maintained by the mobile transmitter 70.

When the carrying device 79 that contains the mobile transmitter 70 is moving, the mobile transmitter 70 transmits a mobile signal 78. However, when the carrying device 79 that contains the mobile transmitter 70 stops moving, the mobile transmitter continues to transmit the mobile signal 78 for a short period of time and then shuts down. As such, the mobile transmitter 70 is able to efficiently conserve power stored in its portable power source 97.

III. Mobile Transmitter/Barrier Operator Operation

The discussion that follows is directed to an embodiment of the system 10, wherein the mobile transmitter 70 somewhat periodically transmits continuously the mobile open and mobile close identification signals 78. Both signals are received by, or are received by and lost by, the operator controller 52 provided by the barrier operator 34 for the automatic opening and closing of the access barrier 12. These signals may be referred to as a close signal or as an open signal. In some embodiments, the mobile signal may not differentiate between an open and a close signal. Examples of hands-free systems which are similar to the one described herein, and which are incorporated by reference, are disclosed in U.S. Pat. No. 7,327,107 and U.S. Pat. No. 7,327,108.

Figure 6:
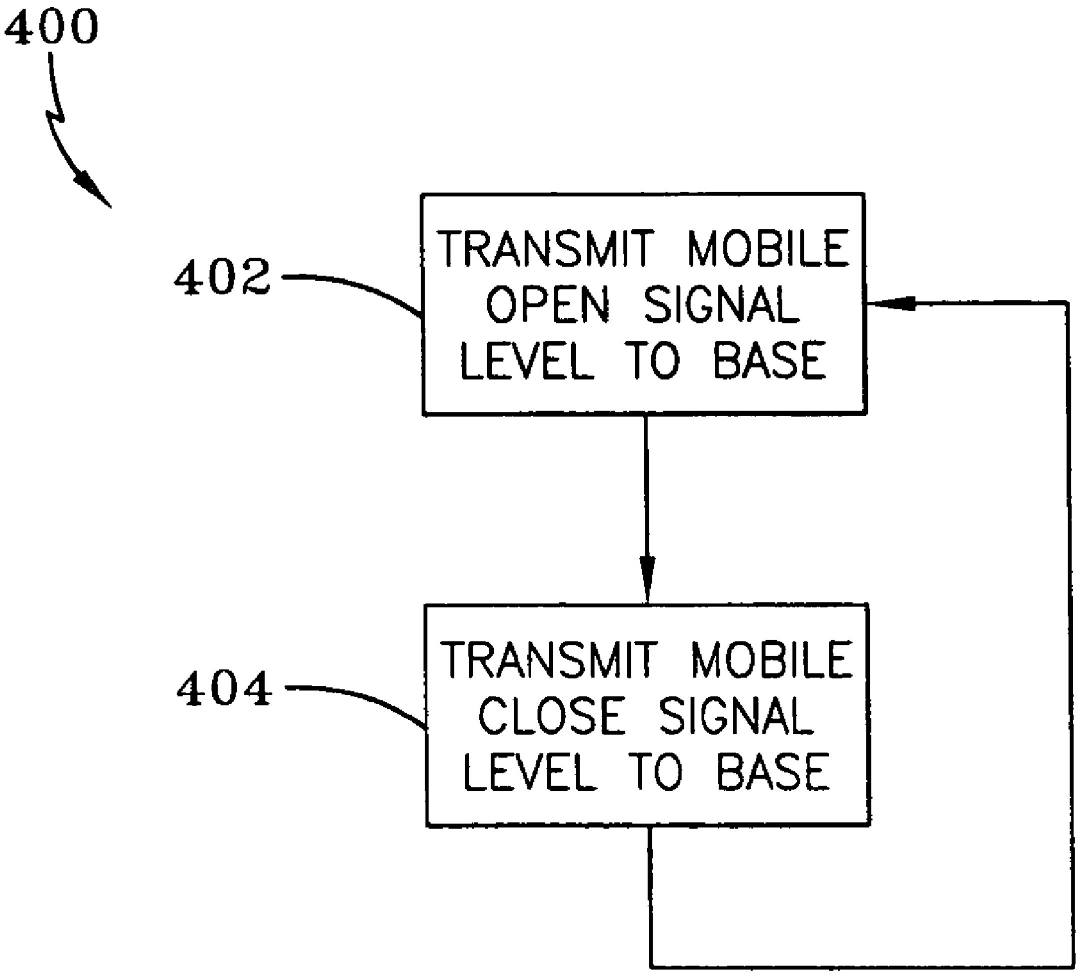
FIG. 6 is an operational flowchart illustrating the operation of the mobile transmitter utilized in the operator system in accordance with the concepts of the present invention.

Referring now to FIG. 6, it can be seen that a methodology for operation of the mobile transmitter 70 is designated generally by the numeral 400. Ideally, the mobile transmitter 70 is powered by the portable power source 97, such as a battery, that may or may not be rechargeable. As previously discussed, when the accelerometer 202 detects movement of the carrying device 79, which will be described in further detail below, the mobile transmitter 70 transmits the mobile open and mobile close signals 78. At step 402, the emitter 76 transmits the mobile open signal 78 that is receivable by the base receiver 56. Subsequently, at step 404, the emitter 76 generates a mobile close identification signal 78 that is also receivable by the base receiver 56. Upon completion of step 404 the process returns to step 402 after an appropriate delay. It will be appreciated that the time period between steps 402 and 404 may randomly change so as to avoid radio frequency interference with other remote transmitters. As previously discussed, the mobile open signal 78 and the mobile close signal 78 may be transmitted at equal or different power levels, but in either case the base receiver 56 is able to distinguish between the two.

Generally, detection of the mobile signal after a predetermined period of absence causes the controller 52 to generate a “command” to open the access barrier 12. And lack of detection of the mobile signal 78 after a predetermined period of detecting the mobile signal causes the operator controller 52 to generate a “command” to close the access barrier 12. If the mobile transmitter’s operation is controlled by the activity sensor 84, then the steps 402 and 404 are only implemented when the carrying device 79 is active. When the carrying device 79 is inactive, the open and close mobile signals 78 are not generated, however a manual button push could generate the corresponding mobile signal 78.

Figure 7:
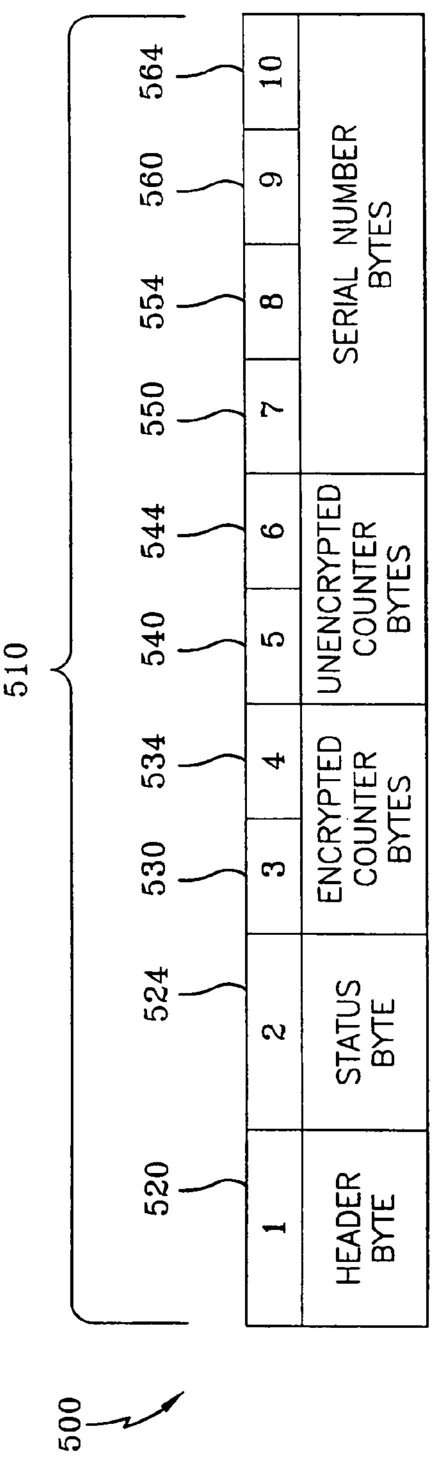
FIG. 7 is a graphical view of a data word that embodies the mobile open and mobile close signals in accordance with the concepts of the present invention.

The transmission protocol and data format that comprise the mobile open and mobile close signals 78 which are continuously and periodically sent when the mobile transmitter 70 is active will be presented. A data format of the mobile open or the mobile close signal 78 sent by the mobile transmitter 70 is generally referred to by the numeral 500, as shown in FIG. 7. In addition to forming the contents of the mobile signal 78, the data format 500 comprises a data word 510 maintained within the memory 74 of the mobile transmitter 70. Specifically, the data format 500 of the mobile open and mobile close signals 78 comprises a 10 byte data word 510, which includes: a header byte 520; a mobile transmitter status byte 524; a first and a second encrypted counter bytes 530 and 534, respectively; a first and a second unencrypted counter byte 540 and 544; and four serial number bytes 550, 554, 560, 564.

Figure 8:
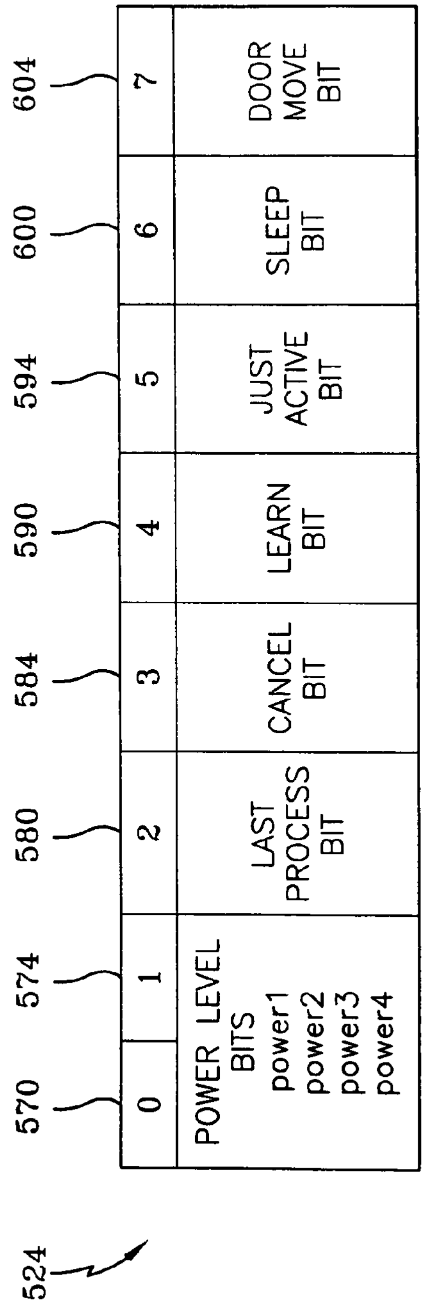
FIG. 8 is a graphical view of the data format associated with a status byte that is part of the data word embodied by the mobile open and mobile close signal shown in FIG. 7 in accordance with the concepts of the present invention.

The header byte 520 contains data that is used by the base receiver 56 to synchronize its operation with the receipt of the data word 510, thus allowing the barrier controller 52 maintained by the barrier operator 34 to retrieve and process the data stored in the remaining transmitted bytes 524-564. Next, the mobile transmitter status byte 524 is configured, such that each bit comprising the byte 524 serves to identify the operating status or condition of the mobile transmitter 70 as it is used in the control of the movement of the access barrier 12. In particular, and as shown in FIG. 8, the mobile transmitter status byte 524 includes power level bits 570 and 574, a last process bit 580, a cancel bit 584, a learn bit 590, a just active bit 594, a sleep bit 600, and a door move bit 604.

The power level bits 570 and 574 are used to identify a power level at which the mobile transmitter 70 may transmit either of the mobile open or mobile close signals 78. For example, the power level bits 570 and 574 may be used to represent a power level that ranges from level 1 to level 4. For example, if both bits have a value of 0, then power level 1 is used. If both bits have a value of 1, then power level 4 is used. If bit 570 is equal to 0 and bit 574 is equal to 1, then power level 2 is used, and so on. Inclusion of an additional power level bit may be added to increase the number of power levels available. The last process bit 580 may be set by the mobile transmitter 70 to indicate whether the last instructed movement of the access barrier 12 was to a closed position or to an opened position. Next, the cancel bit 584 may be set to indicate that the mobile transmitter 70 desires to cancel a command indicated by a previously transmitted mobile open or closed signal 78. The learn bit 590 may be set so as to indicate to the barrier operator 34 that the mobile transmitter 70 has been placed into a learn mode so as to be operatively associated with the barrier operator 34. The just active bit 594 may be set to indicate that the mobile transmitter 70 has been initially powered on by the user of the system 10. The sleep bit 600 may be set to indicate that the mobile transmitter 70 is about to be placed into a momentary or extended sleep state. Both the just active bit 594 and the sleep bit 600 may be generally referred to as warning bits that can be used by the barrier operator to enhance operation thereof. Finally, the door move bit 604 is set when the user actuates the door move button 82. This causes the mobile transmitter to immediately transmit a signal with the door move bit set. When the receiver 56 receives the signal with the door move bit set and the serial number and encrypted data included in the signal have been previously learned to the controller 52, then the controller initiates a door move operation.

Returning to the data word 510, the encrypted counter bytes 530 and 534 are provided to allow the mobile transmitter 70 to maintain a continuous count, as does the unencrypted counter bytes 540 and 544. In particular, the encrypted counter bytes 530, 534 are used by an accelerometer timeout counter/timer and a lose/close timer maintained by the mobile transmitter 700, which will be discussed in detail below. Finally, the serial number bytes 550, 554, 560 and 564 uniquely identify the particular mobile transmitter 70 from which the transmitted mobile signal 78 originated. It should be appreciated that the various bits 570-604 of the status byte 524 may take on one of two binary logic states, which include a set state=1 or a cleared state=0 or vice versa.

Figure 9:
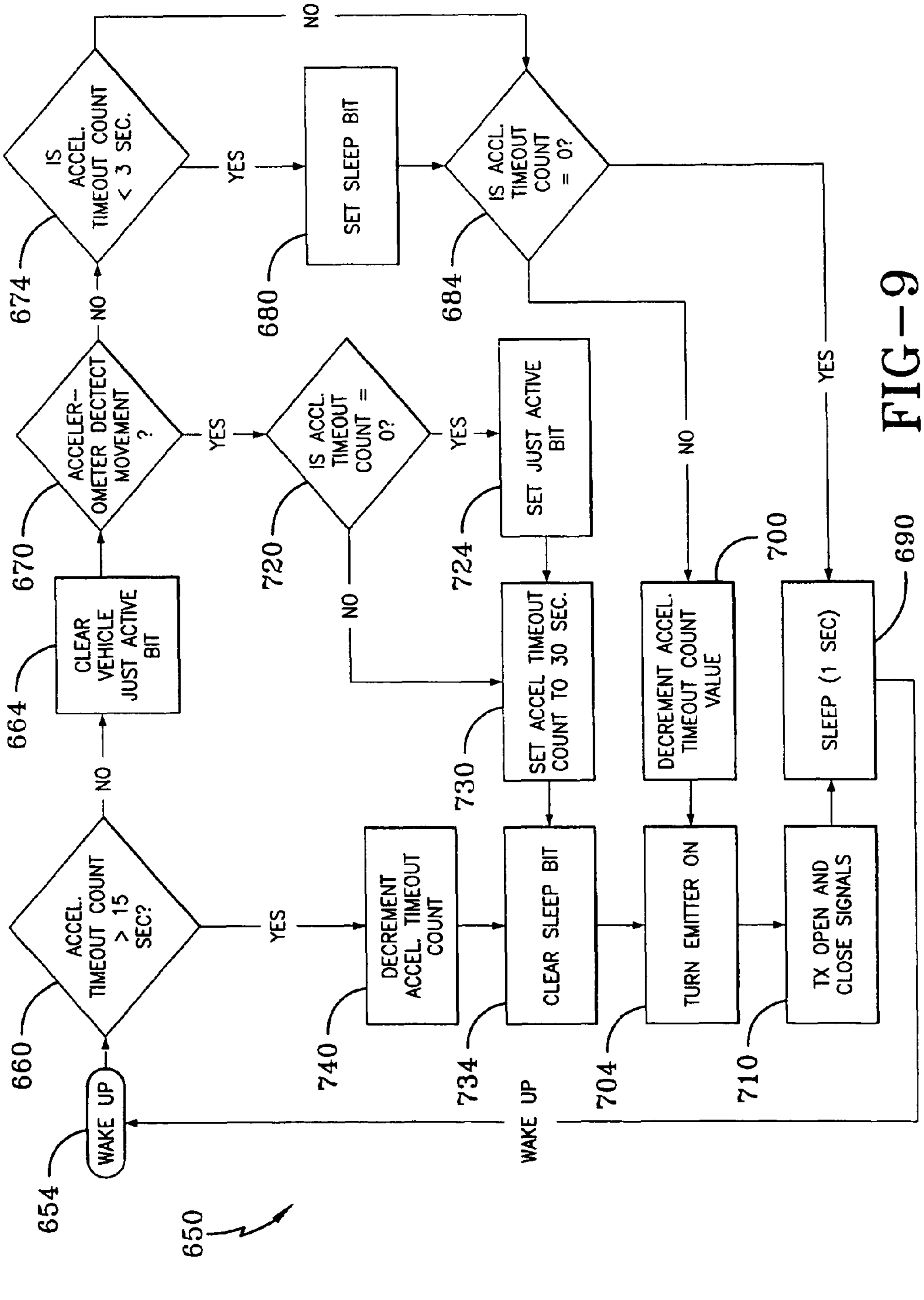
FIG. 9 is an operational flow chart showing the operational steps taken by the mobile transmitter employing the accelerometer shown in FIG. 4 to minimize power usage thereof in accordance with the concepts of the present invention.

Now with the particular structure of the data format of the mobile signal 78 set forth, a discussion regarding the operation of the mobile transmitter 70 when controlling the movement of the access barrier 12 in accordance with the concepts of the present invention 10 will be provided. In particular, the operational steps performed by the mobile transmitter 70 are generally referred to by the numeral 650 as shown in FIG. 9. Initially at step 654, the processor 72, and the activity sensor 84, such as the accelerometer 202, are awoken, or otherwise made operational, while the mobile emitter 76 remains in a sleep mode, such as a low-power or off state. Once the processor 72 and the accelerometer 202 have been awakened, or otherwise powered up at step 654, the process 650 continues to step 660. At step 660, the processor 72 determines whether an accelerometer timeout count exceeds 15 seconds or other designated value. It should be appreciated that an accelerometer timeout counter that maintains the accelerometer timeout count value is maintained by the processor 72 of the mobile transmitter 70, and the timeout count value represents the time duration in which the accelerometer 84 has not detected any movement of the carrying device 79.

If the accelerometer 202 has been inactive (timed-out) for more than 15 seconds, then the process continues to step 664. At step 664, the "vehicle just active" bit 594 is cleared, and the process 650 continues to step 670, whereby the mobile transmitter 70 determines whether the accelerometer 202 has detected any movement of the carrying device 79. If the accelerometer 202 has not detected any movement of the carrying device 79, then the process 650 continues to step 674, where the mobile transmitter 70 determines whether the accelerometer timeout count value has timed-out for a period of time less than 3 seconds or other designated time period. In other words, step 674 determines whether it has been less than three seconds since the accelerometer 84 has detected movement of the carrying device 79. If the accelerometer timeout count value is less than three seconds, then the process 650 continues to step 680, whereby the sleep bit 600 is set at the processor 72. The sleep bit 600, when set, is sent to the base operator 34 via the transmitted mobile signal later in the operational steps and thus indicates to the operator controller 52 that the RF emitter 76 of the mobile transmitter 70 will be turned off in the designated time period. Once the sleep bit 600 has been set, then the process 650 continues to step 684. Or, if the accelerometer 202 has timed-out at step 674 for a period less than 3 seconds, then the process 650 continues directly to step 684.

Once at step 684, the processor 72 of the mobile transmitter 70 determines whether the accelerometer timeout counter has a value that is equal to zero. If the accelerometer timeout count value is equal to zero, then the process 650 proceeds to step 690. At step 690, the mobile transmitter 70 is placed into a sleep mode, whereupon the emitter 76 and the accelerometer 202 are turned off for a predetermined period of time. However, the sleep period may be configured to be set to any desired duration. After the 1 second sleep period has expired, the process 650 returns to step 654 whereby the accelerometer 202 and the processor 72 are turned on, and the emitter 76 remains off. It should be appreciated that the time period of the sleep timer may fluctuate by several milliseconds.

However, if at step 684, the accelerometer timeout count value is not equal to zero, then the process 650 continues to step 700. At step 700, the processor 72 decrements the accelerometer timeout count value by a predetermined value, such as 1 second for example. After the accelerometer timeout count value has been decremented, the process 650 continues to step 704, whereby the emitter 76 is turned on. Once the emitter 76 of the mobile transmitter 70 is turned on, it continuously and repeatedly transmits the mobile open signal 78 and the mobile close signal 78, as indicated at step 710. After step 710 has been initiated, the mobile transmitter 70 is placed into a sleep mode for a 1 second duration as indicated at step 690.

Returning to step 670, if the accelerometer 202 does detect movement of the carrying device 79, the process 650 continues to step 720, where the processor 72 determines whether the accelerometer timeout count value is equal to zero. If the accelerometer timeout count value is equal to zero, the process 650 continues to step 724, whereby the just active bit 594 is set, while the process 650 continues to step 730. At step 730, the accelerometer timeout count value is reset to a predetermined value. However, it should be appreciated that the accelerometer timeout count value may be reset to any desired value. Alternatively, if the accelerometer timeout count value is not equal to zero as determined at step 720, then the process 650 continues directly to step 730. In any event, after the accelerometer timeout count value has been set to a predetermined time value at step 730, the process 650 continues to step 734, whereby the sleep bit 600 is cleared. Once the sleep bit 600 is cleared, the process 650 performs steps 704, 710, and 690, in the manner previously discussed.

Alternatively, if at step 660, the processor 72 determines that the accelerometer timeout count value is greater than 15 seconds, indicating that the accelerometer 202 has not detected any movement of the carrying device for at least 15 seconds, the process 650 continues to step 740. At step 740, the accelerometer timeout count value is decremented by 1 second, before performing steps 734, 704, 710, and 690 as previously discussed.

Figure 10:
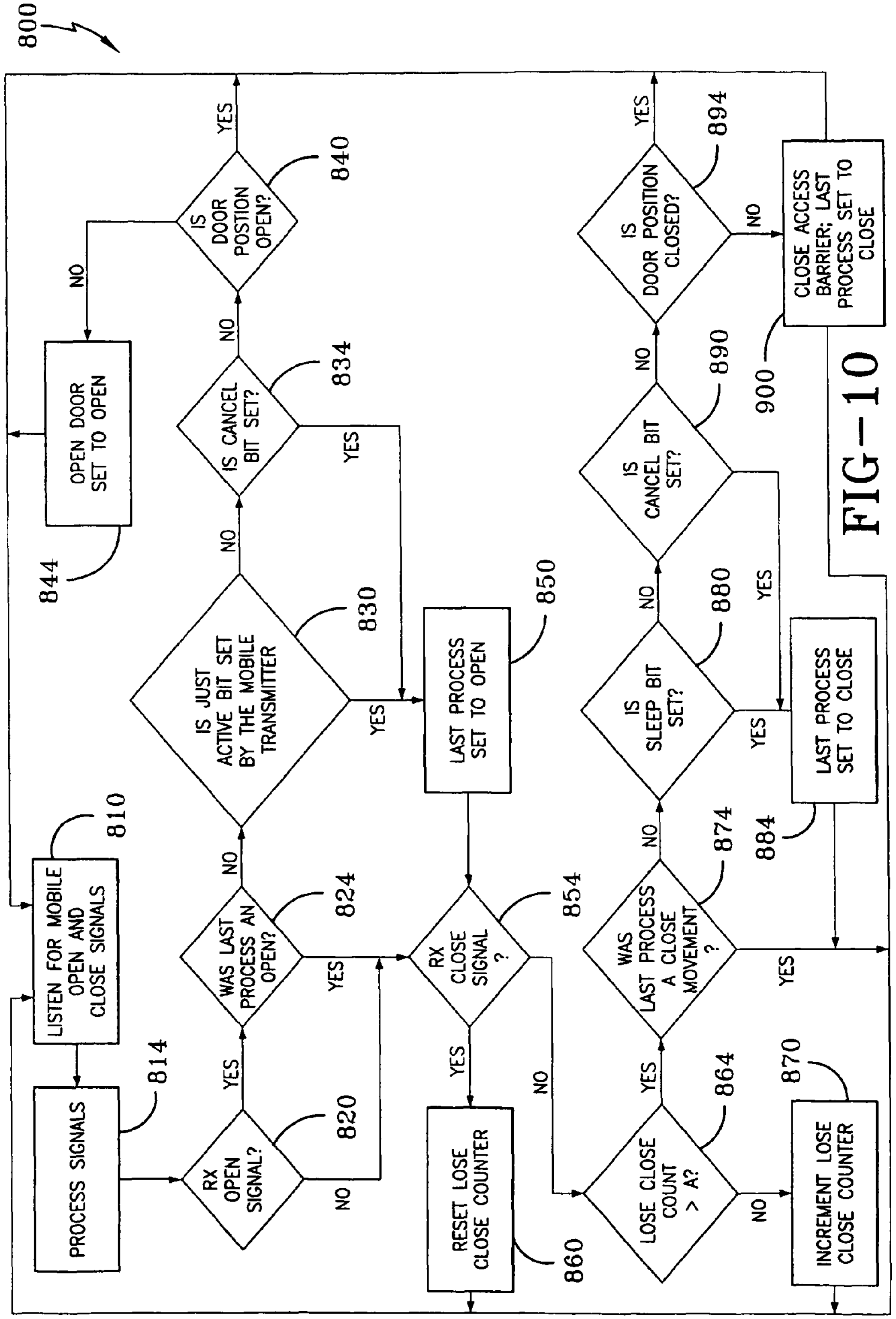
FIG. 10 is an operational flow chart illustrating the operation of the barrier operator and the mobile transmitter in accordance with the concepts of the present invention.

Referring now to FIG. 10, the operational steps taken by the barrier operator 34 when used in association with the mobile transmitter 70 are generally referred to by the numeral 800. Initially, it will be appreciated that the mobile transmitter 70 is learned to the controller 52 provided by the barrier operator 34 in a conventional fashion by actuation of the learn button 59 on the controller 52 and actuation of one of the buttons 82,83 on the mobile transmitter 70. Of course, other learning methods could be used. In this methodology, the operator controller 52 maintains a variable identified as "last process," which is initially set equal to "open" whereby this variable may be changed to "close" when appropriate. Other variables may be maintained to supplement and enhance operation of the system, such as a "lose close" variable count that is maintained to ensure that the mobile transmitter 70 is in fact out of range of the barrier operator 34 before any specific action is taken.

Initially, at step 810, the operator controller 52 monitors frequencies detected by the base receiver 56, and in particular listens for a mobile open signal 78 and/or a mobile close signal 78 generated by the mobile transmitter 70. Next, at step 814 the barrier controller 52 begins processing any of the mobile signals 78 that are received by the base receiver 56. At step 820, the operator controller 52 determines whether an open signal 78 has been received at the base receiver 56. If an open signal 78 has been received at the base receiver 56, then the operator controller 52 investigates the "last process" variable at step 824 to determine whether the last course of action of the access barrier 12 was an "open" door move or a "close" door move. If the last process variable was not set to "open," then at step 830, the controller 52 queries as to whether the "just active" bit 594 has been set and transmitted in the mobile open signal 78 by the mobile transmitter 70. In particular, the "just active" bit 594 is set when the mobile transmitter 70 is initially powered up, and as such, the "just active" bit 594 is cleared after approximately 15 seconds or other designated period of operation. However, if the "just active" bit 594 has not been set, then the controller 52 queries as to whether the cancel bit 584 has been set by the mobile transmitter 70, as indicated at step 834. If the cancel bit has not been set, then the process 800 continues to step 840, where the operator controller 52 determines whether the actual physical position of the access barrier 12 is in a position other than closed. As noted previously, the operator controller 52 is able to detect the position of the access barrier 12 by use of mechanisms associated with the system 10. In any event, if the access barrier 12 position is open, the process returns to step 810, whereby the base receiver 56 listens for the mobile open and mobile closed signals 78. However, if the actual physical position of the access barrier 12 is not open (other than closed), as determined at step 840, the process continues to step 844, whereby the operator controller 52 executes an open door command, and the last process variable is set equal to OPEN. Upon completion of step 844, the process returns to step 810.

However, if at step 834, the cancel bit 584 was set, or if at step 830 the "just active" bit 830 was determined to be set, then the process 800 continues to step 850. At step 850, the last process bit 580 is set to open, and the process 800 continues to step 854, whereby the operator controller 52 determines whether a mobile close signal 78 has been received from the mobile transmitter 70. If a mobile close signal 78 has been received, then the process 800 continues to step 860, whereby the "lose close" count maintained by the operator controller 52 of the barrier operator 34 is reset to zero, before returning to step 810.

Alternatively, if a mobile close signal 78 has not been received by the barrier controller 52 at step 854, then the process 800 continues to step 864. At step 864, the operator controller 52 determines whether the "lose close" count value is greater than a variable "A". In one aspect, the variable "A" may comprise a count value of 2 or 3 or any other suitable value needed to ensure proper operation of the system. If the "lose close" count value is not greater than the variable "A" then the process 800 continues to step 870. At step 870, the "lose close" count value is incremented before the process 800 returns to step 810, whereby the base receiver 56 continues to listen for mobile open or mobile close signals 78, as previously discussed. However, if the "lose close" count value is greater than the variable "A", then the process 800 continues to step 874, whereby the operator controller 52 determines whether the last process or last move of the access barrier 12 was to an opened or closed position. If the last process was to move the door toward a closed position, then the process 800 returns to step 810, although if the last process was to move the door toward an open position, then the process 800 continues to step 880. At step 880, the process 800 determines whether the sleep bit 600 of the mobile signal 78 has been set. If the sleep bit 600 has been set, then the process 800 continues to step 884, whereby the controller 52 sets the last process variable to closed.

However, if at step 880 the sleep bit 600 is not received by the base receiver 56, then the process 800 continues to step 890, whereby the base receiver 56 determines whether the cancel bit 584 contained within the signal 78 sent from the mobile transmitter 70 has been set. Thus, if a cancel signal is received by the base receiver 56, then the process proceeds to step 884, wherein the last process variable is set to close as previously discussed. However, if the cancel signal bit 600 has not been set, then the process 800 continues to step 894. At step 894, the operator controller 52 determines whether the actual physical position of the access barrier 12 is closed or not. If the access barrier 12 is closed then the process 800 returns to step 810, wherein the base receiver 56 continues to listen for mobile open and mobile closed signals 78. Alternatively, if the actual physical position of the access barrier 12 is not in the closed position, then the process 800 continues to step 900. At step 900, the barrier operator 34 closes the access barrier 12, and the last process variable is set to close, before returning to step 810, wherein the base receiver 56 continues to listen for mobile open and mobile close signals 78 sent from the mobile transmitter 70.

Returning to step 820, if an open mobile signal 78 was not received by the base receiver 56, then the process 800 continues to step 854, and proceeds through the process 800 as previously discussed.

Based upon the foregoing, one advantage of the power conserving mobile transmitter is that it utilizes an activity sensor, such as an accelerometer, to determine whether a carrying device, such as a vehicle, is moving, just starting to move, or stopped moving. In other words, the mobile transmitter is able to set warning bits that are included in the signal generated by the mobile transmitter's emitter when the activity sensor first detects a change in movement. These warning bits are indicative of whether the carrying device is just beginning movement after being stopped for a period of time (warning bit=just active bit), or if the carrying device is no longer moving after moving for a period of time (warning bit=sleep bit). The warning bits are received by the operator controller which ensures desired hands-free movement of the associated access barrier. This solves the problem of unwanted door movements sometimes caused by prior art hands-free systems. As such, the operating system disclosed herein is advantageous in that it is able to differentiate between a mobile close signal that is lost because the mobile transmitter has been carried out of signal receiving range of the operator controller and a mobile close signal that is lost because the carrying device, although in range of the operator controller, is no longer moving and has been turned off. The latter scenario results in setting of the sleep bit. And the operating system is also able to differentiate between a mobile open signal that is received because the mobile transmitter is carried into signal receiving range of the operator controller and a mobile open signal that is received when the carrying device begins moving after having been stopped for a period of time. The latter scenario results in setting of the just active bit. This cooperation between the mobile transmitter and the operator assists in ensuring stable operation of the barrier operator system.

Thus, it can be seen that the objects of the invention have been satisfied by the structure and its method for use presented above. While in accordance with Patent Statutes, only the best mode and preferred embodiment has been presented and described in detail, it is to be understood that the invention is not limited thereto and thereby. Accordingly, for an appreciation of the true scope and breadth of the invention, reference should be made to the following claims.

What is claimed is:

1. An operator system for automatically controlling access barriers based on movement of a carrying device, comprising:

an operator controller associated with an access barrier;

a base receiver associated with said base controller, said base receiver configured to only receive signals when in an operate mode;

a mobile transmitter including an activity sensor configured to monitor movement in at least one axis of movement and a mobile emitter, said mobile transmitter configured to automatically emit from said mobile emitter a mobile open signal and a mobile close signal containing at least one warning data bit that is placed in a set state when said activity sensor first detects a change in movement of said mobile transmitter, wherein said base receiver in said operate mode receives said mobile open signal and said mobile close signal and said operator controller resets a last process variable when said at least one warning bit is received and said operator controller controls movement of the access barrier based on the status of said at least one warning bit and receipt of said mobile open signal and said mobile close signal.

2. The operator system according to claim 1, wherein said at least one warning bit is a just active bit and a sleep bit, wherein said just active bit is set when said mobile transmitter first detects movement of the carrying device after not detecting movement for a predetermined period of time, and wherein said sleep bit is set when said mobile transmitter first detects non-movement of the carrying device after a period of movement.

3. The operator system according to claim 2, wherein said just active bit is cleared after said activity sensor has detected movement of the carrying device for a predetermined period of time.

4. The operator system according to claim 2, wherein said sleep bit is cleared after said activity sensor detects movement of the carrying device.

5. The operator system according to claim 2, wherein if said operator controller receives said mobile open signal and said last process variable is not set to open, and said just active bit is set, then said last process variable is reset to open.

6. The operator system according to claim 2, wherein if said operator controller does not receive said mobile open signal nor said mobile close signal, and said operator controller determines that said last process variable is not set to close and said sleep bit is set, then said operator controller sets said last process variable to close.

7. The operator system according to claim 2, wherein said operator controller maintains a lose close counter that is updated each time said base receiver does not detect said mobile close signal, such that when said lose close count value is greater than a predetermined value, said access barrier is closed.

8. The operator system according to claim 7, wherein said operator controller resets said lose close count value if said mobile open signal and said mobile close signal are received and said just active bit has been set.

9. A method for automatically controlling at least one access barrier comprising:

providing a mobile transmitter having an activity sensor and a mobile emitter, said mobile emitter configured to automatically generate a mobile open signal and a mobile close signal when said activity sensor detects movement of said mobile transmitter;

providing an operator controller associated with a base receiver and an access barrier, said base receiver receiving said mobile open signal and said mobile close signal when in an operate mode;

setting at least one warning bit that is included in said mobile open signal and said mobile close signal when said activity sensor first detects a change in movement of said mobile transmitter; and moving said access barrier by said operator controller when in said operate mode depending upon a status of said at least one warning bit and receipt of said mobile open signal or loss of said mobile close signal.

10. The method according to claim 9, further comprising:

setting a just active bit that is included in said mobile open signal and said mobile close signal when said activity sensor first detects movement after not detecting movement for a predetermined period of time; and setting a sleep bit that is included in said mobile open signal and said mobile close signal when said activity sensor first detects non-movement after a period of movement.

11. The method according to claim 10, further comprising:

clearing said just active bit after said activity sensor has detected movement for a predetermined period of time.

12. The method according to claim 10, further comprising:

clearing said sleep bit after said activity sensor detects movement.

13. The method according to claim 10, further comprising:

maintaining a last process variable by said operator controller which is set by either movement of the at least one access barrier or receipt of said just active bit or said sleep bit.

14. The method according to claim 13, further comprising:

setting said last process variable to open upon receiving said mobile open signal with said just active bit set and when said last process variable is not set to open.

15. The method according to claim 13, further comprising:

setting said last process variable to close upon not receiving said mobile open signal nor said mobile close signal with said sleep bit set and when said last process variable is not set to close.

16. The method according to claim 9, further comprising:

maintaining a lose close counter by said operator controller; and updating said lose close counter each time said base receiver does not detect said mobile close signal, such that when said lose close count is greater than a predetermined value, said access barrier is closed.

17. The method according to claim 16, further comprising:

resetting said lose close counter if said at least one warning bit has been set by said mobile transmitter.

* * * * *